Aug. 29, 1950
2,520,483
BAREND GYSBERTUS HENDRIKUS VAN DER JAGT
NOW BY CHANGE OF NAME,
BAREND GYSBERTUS HENRY VANDERJAGT
PROCESS OF MAKING UPHOLSTERY MATERIAL
FROM PALMETTO FIBERS
Filed July 20, 1946
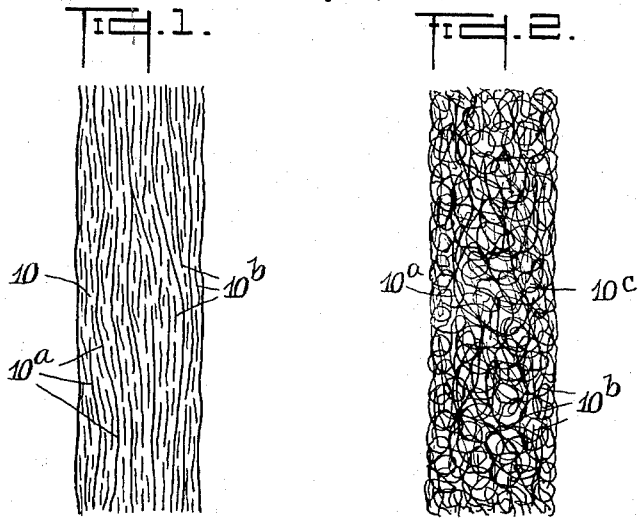
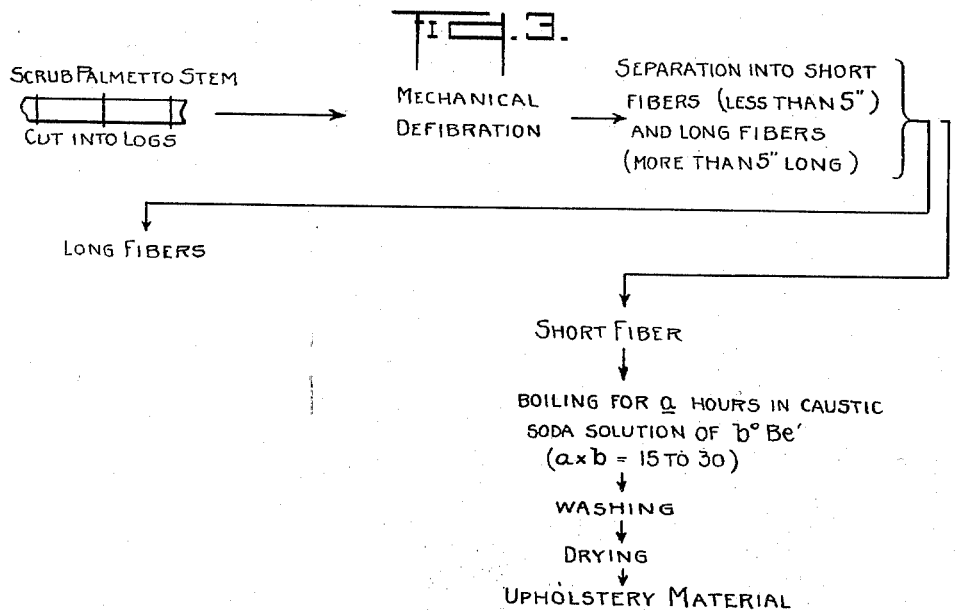
Barend Gysbertus Hendrikus Van Der Jagt
Now by Change of Name
Barend Gysbertus Henry Vanderjagt
INVENTOR
BY
ATTORNEY Patented Aug. 29, 1950

2,520,483

UNITED STATES PATENT OFFICE 2,520,483

PROCESS OF MAKING UPHOLSTERY MATERIAL FROM PALMETTO FIBERS

Barend Gysbertus Hendrikus van der Jagt, Washington, D. C., now by change of name Barend Gysbertus Henry Vanderjagt Application July 20, 1946, Serial No. 685,016

4 Claims. (Cl. 8—117)

This application is a continuation in part of my copending application Ser. No. 507,924 which was filed on October 23, 1943, now abandoned, as a continuation in part of my application Ser. No. 450,989 filed on July 15, 1942, now abandoned.

The present invention relates to a novel fibrous upholstery material and to a process of producing such material from fibers obtained by a mechanical defibration of the stems of scrub palmetto plants. These plants grow abundantly in Florida and are also found in other parts of the continental United States and in the West Indies. The botanical name of the scrub palmetto plant is "Serenoa repens." The part of the scrub palmetto plant from which the fibers to be treated according to the present invention are obtained grows in a substantially horizontal direction under ground and, for this reason, it was previously believed to be part of the root of the plant and identified as such in my application Ser. No. 507,924 above referred to. However, according to recent information supplied by the U. S. Department of Agriculture this underground part of the scrub palmetto plant is botanically its stem, and, consequently, it is identified as the stem in the present application.

Palmetto stem fibers, as obtained by mechanical defibration of scrub palmetto stems, are coarse, smooth, straight and elastic hard fibers, which heretofore have been used only to a very limited extent in the manufacture of bristle brushes. In the form in which these fibers are obtained from mechanical defibration processes, they are unsuitable for stuffing or upholstery purposes and incapable of being curled or crinkled by any of the mechanical processes used for the curling of horse hair, crin végétal, and other animal and vegetable fibers in preparing such fibers for use as upholstery material.

One object of the present invention is to produce from fibers obtained by the mechanical defibration of stems of scrub palmetto plants (Serenoa repens) a curly, highly elastic upholstery material which is suitable for the filling or stuffing of cushions, mattresses or pillows, and which can also be treated with adhesive substances, such as rubber latex, and molded into highly elastic upholstery articles of any desired shape.

Another object of the invention is to produce from fibers obtained by mechanical defibration of the stems of scrub palmetto plants a comparatively inexpensive upholstery material which is an excellent substitute for curled horse hair.

Still another object of the invention is to convert the straight, smooth, highly elastic fibers obtained from a mechanical defibration of the stems of scrub palmetto plants into a curly, highly resilient upholstery material by means of a purely chemical treatment of the fibers.

A still further object of the invention is to produce from fibers obtained by a mechanical defibration of the stems of scrub palmetto plants a more or less tightly curled fibrous upholstery material which is not only highly resilient, but also extraordinarily resistant against moisture, vermin, molds, humidity, and atmospheric and chemical corrosion.

In an application Ser. No. 685,017 filed concurrently herewith, a process is described and claimed for producing a light straw colored spinnable sliver from fibers obtained by a mechanical defibration of the stems of scrub palmetto plants (Serenoa repens), said process including the steps of separating the mixture of long and short fibers obtained from the mechanical defibration of the scrub palmetto stems into short fibers up to 5 inches length and longer fibers, tackifying the longer fibers and forming them into a spinnable sliver while in tacky condition. This sliver forming process according to the concurrently filed application is inapplicable to the short fibers up to about 5 inches length or to mixtures containing an appreciable proportion of such short fibers.

It is, therefore, a specific object of the present invention, to produce an elastic fibrous upholstery material from scrub palmetto stem fibers up to 5 inches length, as may be obtained by a separation of the fiber mixtures resulting from the mechanical defibration of scrub palmetto stems into long fibers and short fibers.

These and other objects, which will appear more clearly as the specification proceeds, are accomplished generally by a process comprising the steps of boiling fibers obtained by a mechanical defibration of stems of scrub palmetto plants (Serenoa repens) for a period ranging from about one-half hour to about two and one-half hours in an aqueous caustic soda solution of about 6° to about 55° Bé. strength, the strength of the solution being related to the boiling time according to the formula: $a \times b = 15$ to $30$, where $a$ is the boiling time in hours and $b$ is the strength of the solution in degrees Bé., washing the fibers with an aqueous medium having a pH value between about 5 and 7, and drying them, a strong and tight curl developing in the fibers during the drying.

Treatment of fibers with caustic solutions is generally well known in the textile art, but none of the fibers subjected heretofore to caustic lye treatments develops as a result of such treatment a strong and tight curl which, without any mechanical preparation, renders the fibers suitable for upholstery purposes. Moreover, the mechanical strength of all fibers used heretofore commercially for textile or upholstery purposes would be substantially impaired by a boiling of the fibers in a caustic lye the strength of which is related to the boiling time in accordance with the above formula defining the practical limits of my process.

The present invention is based on the discovery that scrub palmetto stem fibers retain substantially all their mechanical strength and elasticity when boiled in strong caustic solutions for extended periods of time, as indicated by my formula, and, moreover that these fibers when washed after such boiling with an aqueous medium will develop, on drying, a very strong and tight curl which renders them, without any mechanical treatment, extremely suitable for stuffing and upholstery purposes, and particularly as a substitute for curled horse hair.

The aqueous medium in which the fibers are washed after completion of the caustic lye boiling step, may be cold or warm water. The washing water may be acidified to a pH value between about 5 and 7 by addition of a suitable acid, such as hydrochloric acid or acetic acid, to effect neutralization of any alkali remaining in the fibers.

The following examples describe several embodiments of the invention, reference being had to the accompanying drawings in which:

Figure 1 illustrates, somewhat diagrammatically, a group of fibers as obtained by a mechanical defibration of the stems of scrub palmetto plants.

Figure 2 illustrates, diagrammatically, the same group of fibers after a treatment in accordance with my invention, and Figure 3 is a flow diagram of a specific embodiment of the process according to the invention.

Example 1

The stems of scrub palmetto plants, as dug up from the ground, were cut into equal lengths of about 14", and the resulting logs were mechanically defibrated in a twilly devil. The fibers obtained from this defibration were coarse, smooth and substantially straight, as illustrated at 10 in Fig. 1.

100 kg. of these fibers were placed in a vat containing an aqueous caustic soda solution of 15° Bé. strength and boiled in the solution at atmospheric pressure for one and one half hours. At the end of this period, the fibers were removed from the vat, washed with cold water and spread out to dry. During drying, the fibers developed a strong and tight curl, acquiring an appearance substantially as shown at 10c in Fig. 2. The curled fibers were highly resilient and a sample returned immediately to its original shape and dimensions when released after having been strongly compressed.

Example 2

A fiber mixture obtained by mechanical defibration of 14" logs cut from the stems of scrub palmetto plants (Serenoa repens), as described in Example 1, and containing longer fibers 10a and shorter fibers 10b (see Fig. 1) was separated by screening into short fibers 10b having a length up to 5 inches and long fibers having a length between 5 and 14 inches (see flow diagram of Fig. 3).

50 kg. of the short fibers 10b were placed in an iron vessel containing an aqueous caustic soda solution of 30° Bé. strength and boiled in said solution for one hour. At the end of this period, the fibers, which were still preferably straight but had assumed a brownish color, were washed with lukewarm water adjusted by addition of hydrochloric acid to a pH value of 5 and then spread out to dry. During the drying the fibers developed a strong and tight curl, substantially similar to that of fibers 10c in Fig. 2. The curled fibers had an excellent and permanent elasticity and were found to be particularly valuable for the stuffing of mattresses and cushions.

Example 3

50 kg. palmetto fibers obtained from a mechanical defibration of the stems of scrub palmetto plants (Serenoa repens), as described in Example 1, were boiled for one half hour in an aqueous caustic soda solution of 30° Bé. strength. After washing with cold water acidified with acetic acid to a pH value of 6, the fibers developed, on drying, a highly resilient curl. About 5 kg. of the curled fibers were subsequently dipped into a rubber latex bath, removed from the bath, and placed in a mold having the shape of a cushion. The molded fiber mass was then vulcanized to yield, as the final product, a coherent, highly resilient, preshaped cushion of rubberized curled fibers.

Example 4

20 kg. of palmetto fibers, obtained from a mechanical defibration of stems of scrub palmetto plants (Serenoa repens), as described in Example 1, were boiled for two and one half hours in a caustic soda solution of 6° Bé. strength. After washing in warm water and drying, the fibers assumed a curly and crinkled appearance. The fibers were then arranged in the form of a mattress and sprayed with rubber latex by means of a spray gun. After vulcanization, a formed elastic mattress was obtained, said mattress consisting of curled rubberized coherent fibers.

Example 5

25 kg. of short (up to 5 inches) palmetto fibers obtained by a mechanical defibration of the stems of scrub palmetto plants (Serenoa repens) and subsequent separation of the long fibers from the short fibers, as described in Example 2, were boiled for one half hour in a caustic soda solution of 55° Bé. Then the fibers were washed in cold water and dried. The dried fibers exhibited a very strong and tight curl. Their tensile strength was slightly less than that of the untreated fibers, but their resiliency was markedly increased. The curly fibers were found to be an excellent upholstery material showing good and permanent elasticity.

Example 6

25 kg. of palmetto fibers obtained by a mechanical defibration of stems of scrub palmetto plants (Serenoa repens), as described in Example 1, were boiled for two and one half hours in a caustic soda solution of 12° Bé. strength. After washing in cold water, the fibers were dried. During the drying, the fibers became curled and crinkled to an extent slightly less than that obtained according to Example 1, but fully sufficient to render the fibers permanently resilient and suitable as an upholstery material.

I claim:

1. A process of producing a fibrous upholstery material, comprising the steps of boiling fibers obtained by a mechanical defibration of stems of scrub palmetto plants (*Serenoa repens*) for a period ranging from about one-half hour to about two and one-half hours in an aqueous caustic soda solution of between about 6° and 55° Bé. strength, the strength of the solution being related to the boiling time according to the formula:

$$a \times b = 15 \text{ to } 30$$

where $a$ is the boiling time in hours and $b$ is the strength of the solution in degree Bé., washing the fibers with an aqueous medium having a pH value between about 5 and 7, and drying them, a strong and tight curl developing in the fibers during the drying.

2. A process, as claimed in claim 1, in which the fibers are boiled for one and one-half hours in an aqueous caustic soda solution of 15° Bé. strength.

3. A process, as claimed in claim 1, in which the fibers are boiled for one hour in an aqueous caustic soda solution of 30° Bé. strength.

4. A process of producing a fibrous upholstery material, comprising the steps of boiling fibers of not more than about 5″ length, obtained by a mechanical defibration of the stems of scrub palmetto plants (*Serenoa repens*) and a separation of the fibers of more than about 5″ length from the shorter fibers, for a period ranging from about one-half hour to about two and one-half hours in an aqueous caustic soda solution of between about 6° and 55° Bé. strength, the strength of the solution being related to the boiling time according to the formula:

$$a \times b = 15 \text{ to } 30$$

where $a$ is the boiling time in hours and $b$ is the strength of the solution in degrees Bé., washing the fibers with an aqueous medium having a pH value between 5 and 7, and drying them, a strong and tight curl developing in the fibers during the drying.

BAREND GYSBERTUS HENRIKUS
VAN DER JAGT.

REFERENCES CITED

The following references are of record in the file of this patent:

UNITED STATES PATENTS

| Number | Name | Date |
|---|---|---|
| 74,113 | Monach | Feb. 4, 1868 |
| 81,702 | Stauffen | Sept. 1, 1868 |
| 244,674 | Sachs | July 19, 1881 |
| 250,402 | Stephens | Dec. 6, 1881 |
| 957,152 | Flower | May 3, 1910 |
| 1,051,124 | Kube | Jan. 21, 1913 |
| 1,717,992 | Melliand | June 18, 1929 |
| 1,731,245 | Heberlein | Oct. 15, 1929 |

FOREIGN PATENTS

| Number | Country | Date |
|---|---|---|
| 528,465 | France | Aug. 17, 1921 |
| 328,638 | Great Britain | May 2, 1930 |
| 356,754 | Great Britain | Sept. 7, 1931 |
| 109,528 | Australia | Jan. 25, 1940 |
| 522,620 | Great Britain | June 21, 1940 |